March 4, 1952 L. I. MENDELSOHN 2,588,143
GAUSSMETER
Filed Feb. 17, 1950 3 Sheets-Sheet 1
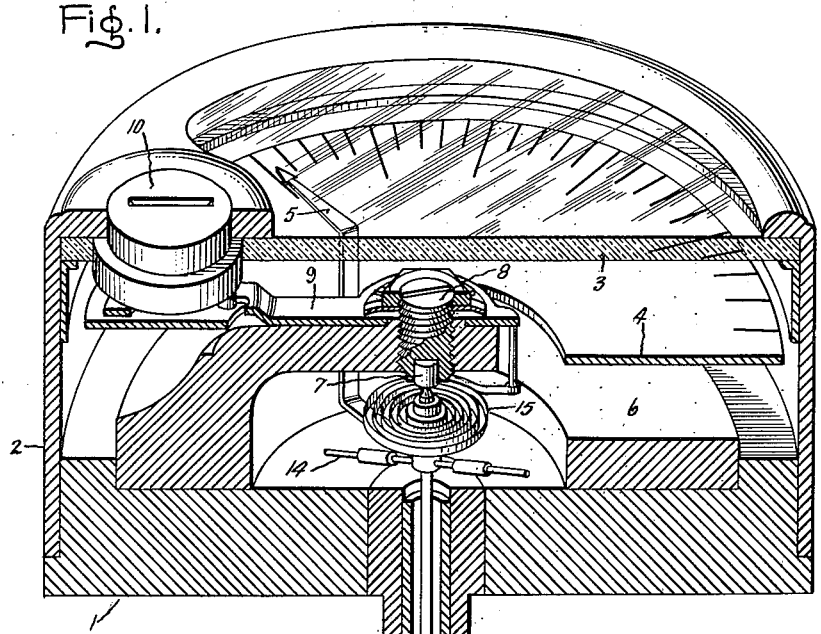
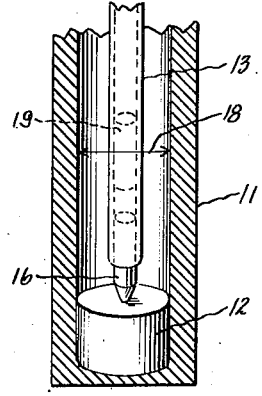
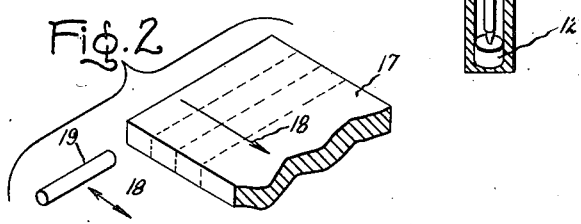
Inventor
Lewis I. Mendelsohn,
by Russell A. Warner
His Attorney March 4, 1952     L. I. MENDELSOHN     2,588,143
GAUSSMETER
Filed Feb. 17, 1950     3 Sheets-Sheet 2
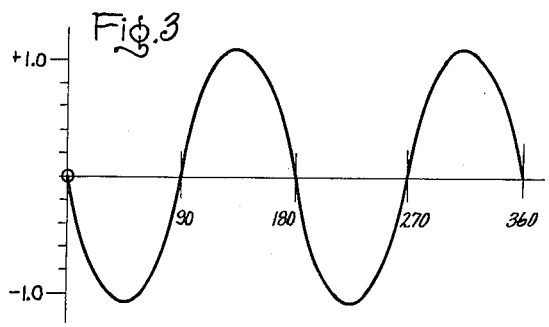
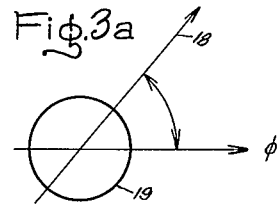
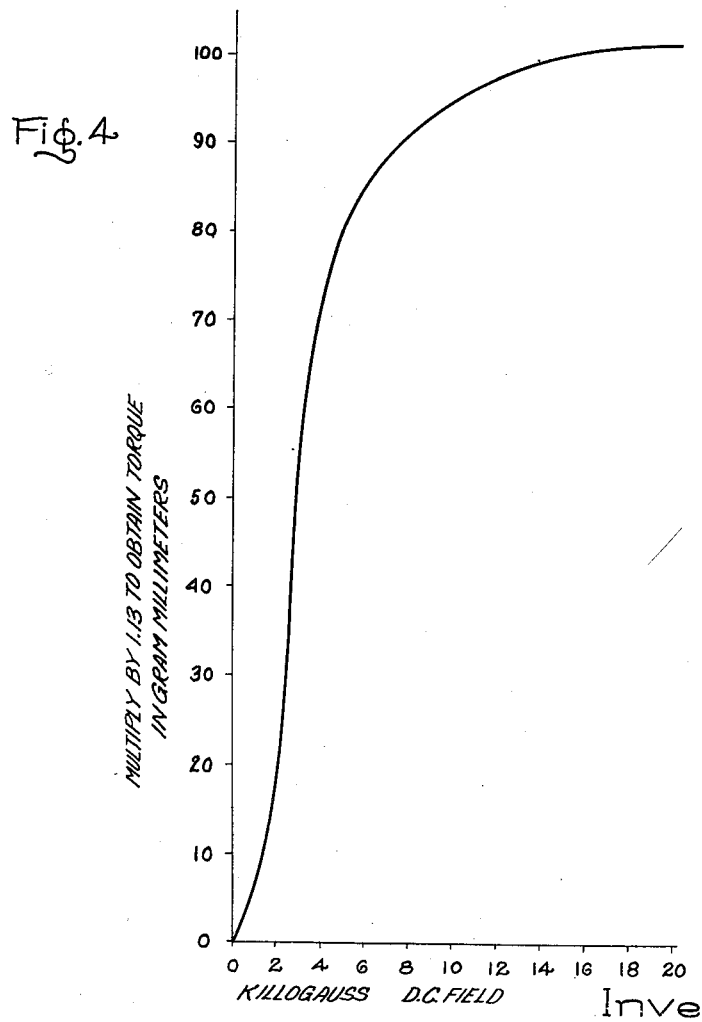
Inventor:
Lewis I. Mendelsohn,
by Russell A. Wainer
His Attorney.

March 4, 1952 — L. I. MENDELSOHN — 2,588,143

GAUSSMETER

Filed Feb. 17, 1950 — 3 Sheets-Sheet 3

Inventor
Lewis I. Mendelsohn
by Russell A. Warner
His Attorney

Patented Mar. 4, 1952

2,588,143

UNITED STATES PATENT OFFICE 2,588,143

GAUSS METER

Lewis I. Mendelsohn, Lynn, Mass., assignor to General Electric Company, a corporation of New York Application February 17, 1950, Serial No. 144,751

5 Claims. (Cl. 175—183)

My invention relates to gaussmeters, and one of its objects is to provide a gaussmeter which greatly extends the range of measurement with respect to fields of high intensity.

Another object of my invention is to provide a gaussmeter capable of measuring the strength of both unidirectional and alternating magnetic fields.

In carrying my invention into effect, I make use of the direction or anisotropic properties of certain magnetic materials and employ as the torque producing rotor of my gaussmeter a tiny rotor of such material. Structurally, my gaussmeter may generally resemble the gaussmeter described in United States Letters Patent 2,447,880, August 24, 1948, but its principle of operation is quite different and its usefulness is greatly extended as compared to the patented gaussmeter.

Figure 5:
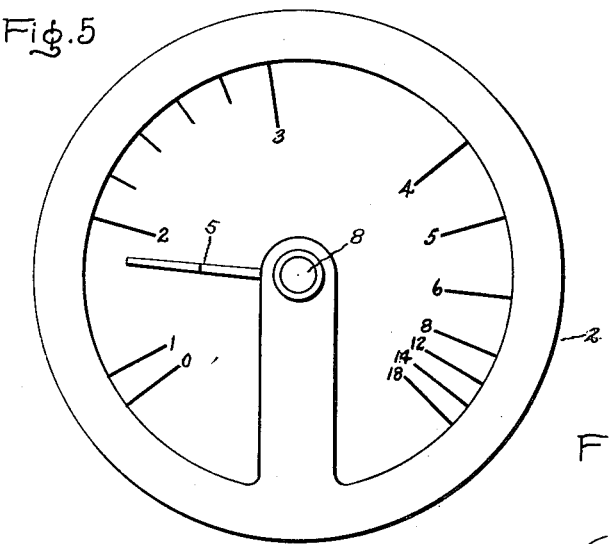
Figure 8:
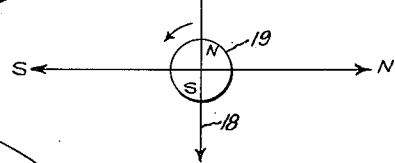
Figure 6:
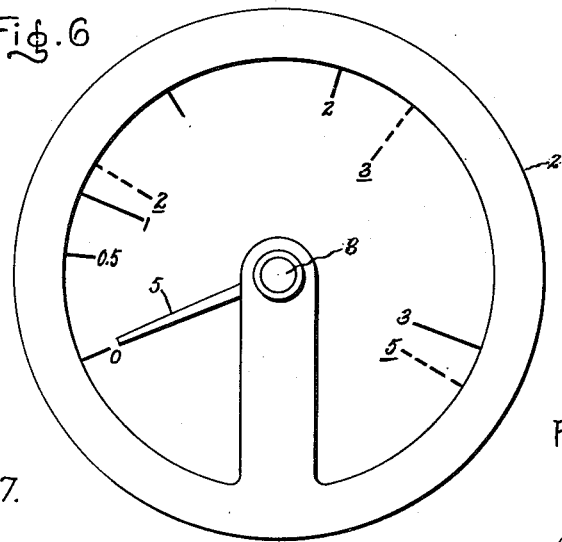
Figure 9:
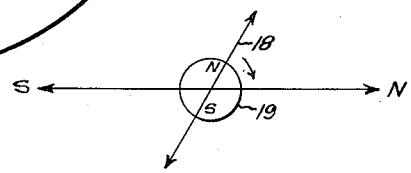
Figure 7:
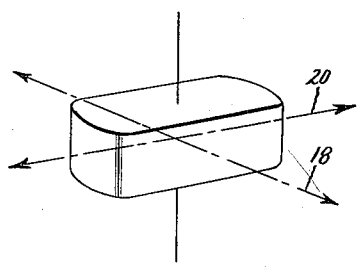

The features of my invention which are believed to be novel and patentable will be pointed out in the claims appended hereto. For a better understanding of my invention, reference is made in the following description to the accompanying drawing in which Fig. 1 is a perspective sectional view through a gaussmeter embodying my invention. Fig. 1a is an enlarged sectional representation of the lower end probe portion of the meter of Fig. 1. Fig. 2 illustrates the manner of constructing the anisotropic rotor of my gaussmeter from strip rolled material so as to obtain the desired anisotropic orientation in the rotor. Fig. 3 shows the anisotropy torque-angle curve of one of my rotors at 19 kilogauss. Fig. 3a is representative of a maximum rotor torque-field relation useful in explaining the curves of Fig. 3. Fig. 4 shows the rotor torque characteristics. Fig. 5 shows the resulting scale distribution, and Fig. 6 shows a gaussmeter scale calibration for measuring both unidirectional and alternating flux fields. Fig. 7 is representative of a rotor having combined torques due to its shape and its anisotropic properties. Figs. 8 and 9 are representative of different torque flux relations of circular anisotropic rotors which have become polarized.

In Fig. 1 of the drawing, there is represented in cross section a structure suitable for utilizing the invention and consists of a circular case having a base 1, side walls 2, and transparent cover 3 through which a suitably graduated stationary scale 4 and moving pointer 5 indicating on the scale may be observed. A support 6 is provided for the upper jewel 7, jewel screw 8, and spring adjusters 9 and 10. Extending downward from the center of base 1 is a small diameter tubular housing 11 of nonmagnetic material which has a lower jewel 12 at its closed lower end. Pivoted between the upper and lower jewels is a shaft 13 which carries the pointer 5 and adjustable balancing arms 14 near its upper end. A spiral spring 15 is secured between shaft 13 and the spring adjuster 3. My invention does not relate to the above-mentioned structure, and the details thereof may be varied to suit requirements. Except for the armature of my magnetometer contained in the lower end of shaft 13, the prod 11 and shaft 13 should be of nonmagnetic material and when the device is to be used for measuring alternating fluxes, these parts should also be made of a nonconducting material or one in which the conductivity is so high that eddy current losses are negligible.

A central hole is drilled in the lower end of shaft 13 as indicated in Fig. 1a, and into this hole is pressed the rotor 19 and then a pivot 16. The important part of my invention is the use of a rotor 19 made of directional or anisotropic magnetic material, and the utilization of its directional torque properties in the operation of the device. While not confining my invention to any particular anisotropic material, I have used an alloy comprising 60 per cent copper, 20 per cent nickel, and 20 per cent iron, called cunife, such as described in United States Letters Patent 2,196,824, with good results. Magnetic materials which exhibit directional magnetic properties suitable for my purposes are believed to have a crystalline structure with the crystal or crystals oriented along a given axis in the material as distinguished from a magnetic material in which the crystals have a random orientation. Cunife material having the necessary magnetic and stable properties required by this invention may be prepared by annealing the alloy at a temperature between 1,000 degrees C. and the melting point, quenching same, cold rolling the alloy with a rolling degree of over 40 per cent and annealing the alloy to a temperature between 500 and 700 degrees C.

In Fig. 2, there is represented at 17 a sheet of cunife which for my purposes may be $\frac{3}{16}$ inch wide and 0.025 inch thick, and which was reduced to the thickness mentioned by cold rolling in the direction of the arrow 18. The arrow is shown double ended to indicate that it is immaterial in which of the two directions the material is passed through the rolls so long as it is along the straight directional line of the arrow. Rotors 19 suitable for my purposes may be made from such a sheet by cutting the strip crosswise into bars as indicated by the dotted lines and then machining cylindrical rotors 19 from such bars, such that the long axes of the bars and cylindrical rotors correspond and the direction of rolling is crosswise in the finished rotors as indicated by the arrow 18 adjacent the finished rotor 19 in Fig. 2. The finished rotor 19 may be 0.05 inch long and 0.015 inch in diameter, and such rotors are inserted into the bore in the lower end of shaft 13 with a tight fit, such that the direction of rolling and resulting crystal orientation, whatever it may be, and the preferred magnetic directional axis are crosswise or at substantially right angles to the shaft along the line 18.

If, now, such a shaft and rotor be placed in a magnetic field generally crosswise of the shaft, the rotor will try to turn the shaft until the axis 18 is in alignment with the direction of the magnetic field although the rotor does not exhibit any magnetic polarity preference. That is, it will try to align the arrow 18 with the field, with a given end of the arrow pointing either towards the positive or negative pole of such field. Thus the directional magnetic properties of the rotor 19 may be represented by the double-ended arrow 18, Fig. 1a, fixed to the nonmagnetic nonconducting shaft 13 along a given axis at right angles to such shaft.

If the spring 15 and pointer 5 be removed from shaft 13 so that the shaft can be turned freely and the rotor part 19 inserted into a cross-magnetic field, and the shaft is then turned and the torque at various angular positions measured, a torque angular displacement curve will be obtained of the character shown in Fig. 3. This curve was taken using a unidirectional field of 19 kilogauss. Thus when the angle between axis 18 and the direction of the field is zero, the torque is zero. As the rotor is turned relative to the direction of the field, a torque resisting turning develops and becomes a maximum at 45 degrees. This 45-degree relationship may be represented in Fig. 3a where arrow $\phi$ represents the direction of the field, 19 the rotor, and 18 the axis of magnetic preference and assuming counterclockwise rotation of the rotor in the field. A maximum torque tending to rotate arrow 18 in line with arrow $\phi$ exists and is plotted below the zero horizontal torque line in Fig. 3. Turning the rotor further, the torque decreases and becomes zero at 90 degrees and then reverses. At 135 degrees, it is again a maximum and then decreases to zero at 180 degrees where arrow 18 is again in line with the field $\phi$. Rotation of the rotor through an additional 180 degrees to make a complete revolution develops the same torque curve as the first 180 degrees of revolution as represented in Fig. 3. This shows that the preferred magnetic axis of the rotor exhibits no magnetic polarity preference. This anisotropic torque, as distinguished from permanent magnet remanent torque, of the cunife rotor depends upon induced magnetization and is independent of past, present or future magnetic history of the material. The magnetic performance is stabilized in the aging and cold working treatment; that is, in metallurgical treatment and is associated with the atomic structure developed in the material during those heat treatments. Cunife, being an age hardened material, is metallurgically extremely stable as has been determined experimentally.

In Fig. 4, I have shown a curve where the ordinates represent torque and the abscissas represent unidirectional field intensity for a 0.015-inch diameter cylindrical cunife rotor, such as has been described previously, installed in a gaussmeter instrument and using a linear spiral spring 15 developing 0.375 gm.-mm. at 90 degrees deflection, and producing a 270-degree scale angle and the scale calibration represented in Fig. 5. It is seen that the field of an intensity up to the order of 19 kilogauss may be measured by this instrument. This represents a field of an intensity about three times higher than could be measured previously with prior permanent magnet rotor gaussmeters, and hence, the invention greatly extends the possible measurement range.

In using the instrument, the prod part 11 is inserted into the air gap or other region in which the field is to be measured, with the rotor part 19 in such field, and with the field at right angles to the shaft. The spring 15 is previously adjusted so that with no torque on the shaft the pointer 5 read at zero on the scale 4. The direction but not the polarity of the field may now be ascertained by rotating the casing until the pointer reads zero. If the pointer is aligned with the magnetic axis of the rotor, the pointer shows the direction of the field. To measure the intensity of the field, the casing is now turned counterclockwise keeping the prod in the field. The rotor 19 tends to remain oriented with its magnetic axis 18 in line with the field against the torque of spring 15 which is thus tensioned, and resulting in a movement of the pointer 5 relative to the scale 4 in an upscale direction. This rotation of the casing is continued until a maximum reading is obtained which corresponds to the angular displacement between the rotor magnetic axis and the field represented in Fig. 3a. The scale is calibrated so that this maximum deflection indicates the magnetic flux density in kilogauss or other suitable units.

It is evident that since the rotor 19 does not recognize polarity but only field direction, the behavior of the rotor in an alternating field will be the same as in a unidirectional field except that the torque will fluctuate with the rise and fall of the alternating field and if such torque were plotted against the frequency of the alternating flux, it would generally resemble the wave of an alternating current of the same frequency with all of the negative half waves reversed. The inertia of the rotor instrument parts is such that with commercial frequency alternating fluxes, the pulsating torque is averaged producing a steady deflection measurement correspondingly less than the measurement produced with a steady unidirectional field of the same maximum intensity. The instrument averaging action would be the same with a pulsating unidirectional field. The instrument may, therefore, have a scale calibrated for the measurement of alternating or pulsating flux field intensities and be used for the measurement of such fields.

In Fig. 6, there is shown an instrument embodying my invention having a full line scale calibrated for unidirectional field measurements, and a dotted line scale calibrated in root-mean-square values of flux for 60-cycle alternating sine wave flux field measurements. It is noted that a 5-kilogauss root-mean-square maximum intensity alternating flux field produces only slightly greater deflection than a 3-kilogauss steady unidirectional field. For this instrument, the spiral spring used at 15 developed 0.18 gram millimeters torque at 90 degrees deflection. The dotted line scale may also be used to measure the root-mean-square value of a unidirectional pulsating flux field if it be assumed that the pulsations are continuous and of a sine wave shape. Finally, the full line scale may be used to measure the average intensity of either alternating or pulsating unidirectional flux fields. Where the instrument is to be used for measuring alternating or pulsating flux fields, the material of the instrument which is in the immediate vicinity of the rotor 19 should be made of non-conducting material as, otherwise, there would occur eddy current losses which would distort the field and produce a frequency error. The prod 11, shaft 13, pivot 16, and jewel 12 should, therefore, be of nonconducting material or of materials having sufficiently high resistance that eddy currents have negligible influence. In all cases, these parts should be made of nonmagnetic material.

In any case where the instrument is to be regularly used for measuring an alternating or pulsating flux field of a special wave shape or frequency, generally it will be advisable to calibrate the instrument under like conditions.

It is now seen that the gaussmeter of my invention greatly extends the range of usefulness as compared to prior art gussmeters. Because the rotor of my gaussmeter is not a permanent magnet, no precautions are necessary to protect the same against demagnetization and the like.

While I have specified a certain kind of material for the rotor and a cylindrical shape therefor, it is believed that other magnetic materials which exhibit directional properties and other rotor shapes can be utilized in carrying out my invention. For instance, it is known that an elongated piece of magnetic material such as ordinary iron will, if placed in a magnetic field, try to align its long axis with the field. Thus, a rotor of ordinary magnetic material elongated in one axis at right angles to the axis of rotation will produce a magnetic torque due to its elongated shape. If such a rotor is also made to have anisotropic properties, it should exhibit a torque which is the resultant of that due to its shape and that due to its anisotropic properties. These torques may be combined in various amounts and in alignment or at various angles to each other.

In Fig. 7, I have represented such a rotor wherein the elongated torque axis is along the line 20 and the anisotropic magnetic directional axis of the material itself is along the line 18 at an angle to 20, both axes being at right angles to the shaft. It is believed that in this manner the useful magnetic torque of the rotor may be increased, and that the natural scale distribution of the instrument in which such a rotor is used may be made more uniform than would be the case where only one of such torques was utilized.

In the gaussmeter described where it is desirable to keep the diameter of the prod 11 as small as possible in order to insert the same into narrow air gaps, the small diameter cylindrical rotor 19 previously described is advantageous, but the invention is not limited in this respect.

In the foregoing description, no consideration has been given as to whether or not the anisotropic rotor 19 becomes polarized as a permanent magnet or the effect thereof, if and when such polarization exists. Polarization can and does occur and when it occurs, it may have a minor influence on the unidirectional field measurement results as will now be discussed. Noticeable polarization effects in the rotor previously described start to occur in a unidirectional field between 2000 and 3000 gausses. For example, if the rotor is placed in a 3000-gauss field and is free to do so, it will align its directional axis with such field due to its anisotropic character previously discussed. It will also become a weak permanent magnet and when removed from the field will retain some permanent magnet polarization in one direction along the preferred axis of magnetization so that, unless demagnetized, when next inserted into a unidirectional field it will have a slight polarity preference as to which of two ways it aligns with such field. This may be pictorially represented as in Fig. 8 where the N-S horizontal axis represents a unidirectional field, 19 the rotor, the double headed arrow 18 the preferred anisotropic axis of the rotor, and the designations $n$ and $s$ on the rotor remnant polarization. It is evident that if the rotor is thus inserted into the unidirectional field with the preferred axis 18 at right angles to the field or in a neutral position, the polarization of the rotor will control and the rotor will turn 90 degrees counter-clockwise, if free to do so. On the other hand, if the rotor happens to be inserted into the field with the preferred axis 18 sufficiently off center as shown in Fig. 9, the anisotropic cw. torque will predominate over the ccw. polarization torque and the rotor will turn clockwise until axis 18 aligns with the field. It is now evident that when such a polarized rotor is used in the gaussmeter, the polarization torque may add or subtract from the anisotropic torque, and that this should be taken into account in the use of the instrument in those circumstances where it might cause error.

Where the gaussmeter is to be used for unidirectional field measurements below 2000, no detectable error is evident with an unpolarized rotor. The rotor when polarized can be quickly depolarized by inserting it into a decreasing alternating magnetic field in the well-known manner. For unidirectional flux field measurements above 2000 gauss where the rotor will become more or less polarized, it will generally be desirable to take the average of two measurements, one where the polarization torque adds to the anisotropic torque and the other where the polarization torque subtracts from the anisotropic torque. If this manner of use is employed and if the rotor is not polarized due to a field too much greater than that being measured, the average reading will give accurate results. Use of the instrument for measuring unidirectional fields above 2000 gauss will polarize the rotor and such polarization will increase but at a decreasing rate with an increase in the polarizing field strength, and it is possible, although unnecessary, to so use the instrument that erroneous results can be obtained. This will be clearer by considering some measurement results taken on an experimental instrument as follows:

| Rotor Magnetized in D.-C. Field Strength of— | Test in D.-C. Field Strength of— | Readings | | Average |
|---|---|---|---|---|
| | | $T-t$ | $T+t$ | |
| 1,400 gauss | 1,400 gauss | 93 | 93 | 93 |
| 2,000 gauss | 1,400 gauss | 93 | 93 | 93 |
| 3,000 gauss | 1,400 gauss | 90 | 96 | 93 |
| 8,000 gauss | 1,400 gauss | 87 | 95 | 91 |
| 14,000 gauss | 1,400 gauss | 86 | 95 | 90.5 |
| 1,400 gauss | 1,400 gauss | 93 | 93 | 93 |
| 19,000 gauss | 3,000 gauss | 95 | 95 | 95 |

In column 1 of the table there is given the strength of a D. C. field to which the rotor was subjected prior to the test. Column 2 gives the field strength measured. Column 3 gives the instrument field strength measurement reading where the polarized torque, if any, was opposed to the anisotropic torque. Column 4 gives the corresponding instrument reading where the polarized torque, if any, aided the anisotropic torque, and column 5 gives the average of the reading of columns 3 and 4. The instrument rotor was depolarized prior to the test. It is seen that if there is any polarization of the rotor for the 1400 and 2000 magnetizing fields (lines 1 and 2 of the test), it has no effect upon the instrument accuracy. For a 3000 gauss polarization (line 3), there is a spread of about six per cent in the two readings 90 and 96, but the average 93 is correct. For a polarization field of 8000 gauss (line 4), the measurement of a 1400 gauss field (by averaging the two readings, columns 3 and 4) is low and in error by two per cent; and when the polarization is increased to magnetization in a 14,000 gauss field (line 5), the average reading of 90.5 is low by 2.5 per cent. For the next test line (line 6), the instrument rotor was first depolarized and again gives accurate results. It is seen that while the erroneous results of lines 4 and 5 of the table are possible, this error is unnecessary because it could have been eliminated by first depolarizing the rotor. For the last test (line 7) the spring of the instrument was changed to have approximately double the torque to avoid having the pointer go off a 270-degree scale. This test is included to show that remanent magnetism has no noticeable effect at test magnetic fields of 3000 gauss and above. This is because at 3000 gauss and above, the rotor is saturated and the intensity of magnetization is controlled by the measurement field, and if the rotor shifts in a saturating field, the direction of remanent polarization also shifts and produces no torque.

Below saturation of the rotor, I have also found that the polarizing torque decreases in relation to the anisotropic torque, the higher the field which is being measured. When the instrument is used for measuring alternating fields, the polarization effect can be ignored entirely, as it oscillates and is averaged automatically by the instrument with the reversal of the measurement field every cycle.

It will be evident that the type of gaussmeter described does not depend upon a polarized or permanent magnet rotor of a definite polarized strength, and that its calibration cannot be changed (except in the minor, easily corrected manner described) by polarization or depolarization. This is an important advantage over the permanent magnet rotor type of gaussmeter.

The cunife material previously mentioned as suitable for use in my invention has a low permeability of about 6 and this is advantageous, as it does not cause any appreciable measurement field distortion and gives sufficient torque when used in high intensity measurement fields. For a gaussmeter for use in the low field intensity range but utilizing the anisotropic torque principle described, it may be desirable to use anisotropic rotor material having a higher permeability in order to obtain ample torque in low intensity fields. Also, some expansion improvement in the upper end of the gaussmeter scale may be obtained if an anisotropic rotor material having a higher coercive force and a higher density is used. Modifications in the rotor alloy used to accomplish this are contemplated. The materials described in United States Letters Patent 1,296,824 and 2,194,607 have been found to be useful in this direction.

What I claim as new and desire to secure by Letters Patent of the United States is:

1. A gaussmeter comprising a shaft, a structure rotatively supporting said shaft, means for resiliently resisting rotation of said shaft relative to its supporting structure, a scale on said structure, a pointer on said shaft indicating on said scale, said shaft including a portion made from anisotropic magnetic material having a permeability of about six and which will saturate between 2000 and 3000 gausses and having its anisotropic axis at right angles to the axis of rotation of said shaft, the portions of said shaft and structure adjacent to said anisotropic portion being of nonmagnetic nonconducting material.

2. An anisotropic rotor for a gaussmeter comprising a cylindrical piece of straight directional cold rolled copper-nickel-iron alloy magnetic material with its cylindrical axis coinciding with its axis of rotation and at right angles to the direction of cold rolling.

3. An anisotropic rotor for a gaussmeter comprising a cylinder of straight directional cold rolled magnetic material made from an alloy of 60 per cent copper, 20 per cent nickel and 20 per cent iron, said cylinder being of the order of 0.015 inch in diameter with its cylindrical axis coinciding with its axis of rotation and at right angles to the direction of cold rolling.

4. A gaussmeter having a pair of stationary scales, a pivoted pointer indicating on said scales, a rotor for rotating said pointer, said rotor being made from anisotropic magnetic material with its anisotropic directional axis at right angles to its axis of rotation, and a spring for opposing the rotation of said pointer by said rotor, said meter being calibrated to measure unidirectional flux fields on one of said scales and alternating flux fields on the other of said scales.

5. A rotor for a gaussmeter made of anisotropic magnetic material, means for rotatively supporting said rotor about a given axis, said rotor being elongated along an axis at right angles to its axis of rotation and having its anisotropic axis at an angle to such elongated axis also at right angles to its axis of rotation.

LEWIS I. MENDELSOHN.

REFERENCES CITED

The following references are of record in the file of this patent:

UNITED STATES PATENTS

| Number | Name | Date |
|---|---|---|
| 2,046,717 | Bitter | July 7, 1936 |
| 2,300,336 | Bozorth et al. | Oct. 27, 1942 |
| 2,447,880 | Seaver | Aug. 24, 1948 |

OTHER REFERENCES

Instruments, vol. 22, May 1949, pages 436–439.